United States Patent
Shi

(10) Patent No.: US 12,217,207 B2
(45) Date of Patent: Feb. 4, 2025

(54) SCHEDULING METHOD, APPARATUS, SYSTEM, ELECTRONIC DEVICE, AND STORAGE MEDIUM

(71) Applicant: CONTEMPORARY AMPEREX TECHNOLOGY (HONG KONG) LIMITED, Hong Kong (CN)

(72) Inventor: Deqiang Shi, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/202,205

(22) Filed: May 25, 2023

(65) Prior Publication Data

US 2023/0419233 A1    Dec. 28, 2023

Related U.S. Application Data

(63) Continuation of application No. PCT/CN2022/101680, filed on Jun. 27, 2022.

(51) Int. Cl.
*G06Q 10/00* (2023.01)
*G06Q 10/0633* (2023.01)
*G06Q 10/08* (2023.01)

(52) U.S. Cl.
CPC ......... *G06Q 10/08* (2013.01); *G06Q 10/0633* (2013.01)

(58) Field of Classification Search
CPC ...... G06Q 10/087; G06Q 10/06; G06Q 10/08; G06Q 50/28; G06Q 10/06311; G06N 20/00; G06N 3/08; G06F 30/20; G06V 20/52

See application file for complete search history.

(56) References Cited

U.S. PATENT DOCUMENTS 5,764,014 A * 6/1998 Jakeway ............... G05D 1/0272
                                                                    318/587
9,651,458 B2 * 5/2017 Moore .................. G01S 17/931
(Continued)

FOREIGN PATENT DOCUMENTS

CN    110807236 A    2/2020
CN    111738663 A    10/2020
(Continued)

*Primary Examiner* — Florian M Zeender
*Assistant Examiner* — Milena Racic
(74) *Attorney, Agent, or Firm* — XSENSUS LLP

(57) ABSTRACT

The present application discloses a scheduling method, apparatus, and system, an electronic device, and a storage medium. The method applies to a warehouse management server, and comprises: sending a scheduling instruction to an actual stereoscopic warehouse management server and a stereoscopic warehouse simulation model management server, wherein the scheduling instruction corresponds to a target scheduling policy; and responding to first optimization information and determining a first scheduling update instruction, wherein the first optimization information comprises a scheduling optimization operation for the case of a target scheduling policy scheduling fault, which enables the scheduling update of an actual scheduling task in the case of faults, thereby solving the problem that the existing scheduling simulation method cannot handle and alleviate the fault problem in the logistics task, and improving the work efficiency, work quality and reliability of the actual stereoscopic warehouse scheduling.

9 Claims, 6 Drawing Sheets

(56) References Cited

U.S. PATENT DOCUMENTS

| | | | |
|---|---|---|---|
| 9,934,295 B2* | 4/2018 | Sarferaz | G06F 16/28 |
| 10,062,046 B2* | 8/2018 | Ogden | G06Q 10/08 |
| 10,239,701 B2* | 3/2019 | Wicks | B25J 9/0093 |
| 10,597,235 B2* | 3/2020 | Clucas | B65G 67/02 |
| 10,618,172 B1* | 4/2020 | Diankov | B25J 9/1687 |
| 10,647,528 B1* | 5/2020 | Diankov | B65G 57/22 |
| 10,679,379 B1* | 6/2020 | Diankov | B25J 9/1679 |
| 10,696,493 B1* | 6/2020 | Diankov | B65G 1/0485 |
| 10,696,494 B1* | 6/2020 | Diankov | B65G 57/00 |
| 10,783,462 B1 | 9/2020 | Mo et al. | |
| 11,100,460 B2* | 8/2021 | Stevens | B65G 1/1373 |
| 2018/0300435 A1 | 10/2018 | Eckman et al. | |
| 2020/0184387 A1* | 6/2020 | Khodjasteh Lakelayeh | G06Q 10/0835 |
| 2021/0237274 A1* | 8/2021 | Diankov | B25J 9/1661 |
| 2022/0188767 A1* | 6/2022 | Rorro | G06Q 10/08 |
| 2022/0284393 A1* | 9/2022 | Al | G06Q 10/0875 |
| 2023/0004906 A1* | 1/2023 | Durai Raj K | G06N 5/01 |
| 2023/0116489 A1* | 4/2023 | Srivastava | G06F 9/44526 709/246 |
| 2023/0156158 A1* | 5/2023 | Moyne | G06V 20/52 348/159 |

FOREIGN PATENT DOCUMENTS

| | | |
|---|---|---|
| CN | 112101859 A | 12/2020 |
| CN | 112632798 A | 4/2021 |
| CN | 215709068 U | 2/2022 |

\* cited by examiner

SCHEDULING METHOD, APPARATUS, SYSTEM, ELECTRONIC DEVICE, AND STORAGE MEDIUM

CROSS-REFERENCE TO RELATED APPLICATIONS

The present application is a continuation of PCT Patent Application No. PCT/CN2022/101680, entitled "SCHEDULING METHOD, APPARATUS, SYSTEM, ELECTRONIC DEVICE, AND STORAGE MEDIUM" filed on Jun. 27, 2022, which is incorporated herein by reference in its entirety.

TECHNICAL FIELD

The present application relates to the technical field of warehouse management and, in particular, to a scheduling method, apparatus, and system, an electronic device, and a storage medium.

BACKGROUND ART

At present, the conventional scheduling simulation method for a stacker crane smart stereoscopic warehouse generally consists of the following steps: establishing a stereoscopic warehouse simulation model, then loading different logistics tasks, sending scheduling paths corresponding to the logistics tasks to the simulation model according to the logistics tasks so that the simulation model can start the execution of simulation and provide real-time feedback information, and thus the time consumption and warehouse efficiency of a single logistics task can be calculated.

However, such a scheduling simulation method is unable to handle and alleviate the fault problems in logistics tasks, resulting in situations where multiple faults exist in the real stereoscopic warehouse established after the simulation and the faults cannot be handled in time, which affects the work efficiency and work quality of the stereoscopic warehouse.

SUMMARY OF THE INVENTION

In view of the above problem, the present application provides a scheduling method, apparatus, and system, an electronic device, and a storage medium that are capable of solving the problem that the existing scheduling simulation method cannot handle and alleviate the fault problems existing in logistics tasks.

In a first aspect, the present application provides a scheduling method applied to an electronic device acting as a warehouse management server, comprising: sending a scheduling instruction to an actual stereoscopic warehouse management server and a stereoscopic warehouse simulation model management server, wherein the scheduling instruction corresponds to a target scheduling policy; and responding to first optimization information and determining a first scheduling update instruction, wherein the first optimization information comprises a scheduling optimization operation for the case of a target scheduling policy scheduling fault.

In the technical solution of the embodiments of the present application, the warehouse management server first sends the scheduling instruction corresponding to the target scheduling policy to the actual stereoscopic warehouse management server and the stereoscopic warehouse simulation model management server, thus causing the actual stereoscopic warehouse management server to control an actual operating device to execute the corresponding scheduling operation to execute this target scheduling policy, and when a fault occurs in the scheduling process, the warehouse management server responds to the first optimization information that contains the scheduling optimization operation for the case of the target scheduling policy scheduling fault, so as to generate the first scheduling update instruction corresponding to the scheduling optimization operation, which enables the scheduling update of an actual scheduling task in the case of faults, thereby solving the problem that the existing scheduling simulation method cannot handle and alleviate the fault problem existing in the logistics task, and improving the work efficiency, work quality and reliability of the actual stereoscopic warehouse scheduling.

In first some embodiments, prior to said responding to the first optimization information, the method further comprises: receiving the first optimization information sent by the stereoscopic warehouse simulation model management server, wherein the first optimization information is obtained by means of identification by the stereoscopic warehouse simulation model management server of a fault produced during the execution of the target scheduling policy by the actual stereoscopic warehouse management server.

In first some embodiments, after said responding to the first optimization information and determining the first scheduling update instruction, the method further comprises: sending the first scheduling update instruction to the actual stereoscopic warehouse management server. These embodiments can enable the actual stereoscopic warehouse management server to execute an updated scheduling operation according to the first scheduling update instruction, so as to resolve the fault existing in the actual scheduling.

In some embodiments, prior to said sending a scheduling instruction to an actual stereoscopic warehouse management server and a stereoscopic warehouse simulation model management server, the method further comprises: acquiring multiple types of to-be-verified scheduling policies; sending, according to each type of to-be-verified scheduling policy, a scheduling instruction corresponding to the to-be-verified scheduling policy to the stereoscopic warehouse simulation model management server; acquiring completion time for each to-be-verified scheduling policy to execute scheduling simulation in the stereoscopic warehouse simulation model management server; and determining the target scheduling policy among the multiple to-be-verified scheduling policies according to the completion time of scheduling simulation for each to-be-verified scheduling policy.

In some embodiments, said determining the target scheduling policy among the multiple to-be-verified scheduling policies according to the completion time of scheduling simulation for each to-be-verified scheduling policy comprises: determining, among the multiple to-be-verified scheduling policies, a to-be-verified scheduling policy with the shortest completion time of scheduling simulation as the target scheduling policy. In these embodiments, the one with the shortest completion time of simulation is selected as the target scheduling policy, which makes the scheduling efficiency of the final practically applied scheduling policy to be the highest, thereby improving the efficiency of the actual scheduling.

In some embodiments, prior to said acquiring completion time for each to-be-verified scheduling policy to execute scheduling simulation in the stereoscopic warehouse simulation model management server, the method further comprises: for each to-be-verified scheduling policy, responding to second optimization information corresponding to the to-be-verified scheduling policy, and determining a corresponding second scheduling update instruction, wherein the second optimization information comprises a scheduling optimization operation for the case of a simulation fault of the corresponding to-be-verified scheduling policy; and sending the second scheduling update instruction corresponding to the to-be-verified scheduling policy to the stereoscopic warehouse simulation model management server. The embodiments of the present application introduce scheduling update processing in case of a simulation fault during the verification of each scheduling policy, so that the reliability of the execution of scheduling of each to-be-verified scheduling policy can be evaluated and the optimal scheduling policy can be finally selected.

In a second aspect, the present application provides a scheduling apparatus applied to a warehouse management server, the apparatus comprising a sending module and a responding and determining module, the sending module being used for sending a scheduling instruction to an actual stereoscopic warehouse management server and a stereoscopic warehouse simulation model management server, wherein the scheduling instruction corresponds to a target scheduling policy; and the responding and determining module being used for responding to first optimization information and determining a first scheduling update instruction, wherein the first optimization information comprises a scheduling optimization operation for the case of a target scheduling policy scheduling fault.

In the technical solution of the embodiments of the present application, the warehouse management server first sends the scheduling instruction corresponding to the target scheduling policy to the actual stereoscopic warehouse management server and the stereoscopic warehouse simulation model management server, thus causing the actual stereoscopic warehouse management server to control an actual operating device to execute the corresponding scheduling operation to execute this target scheduling policy, and when a fault occurs in the scheduling process, the warehouse management server responds to the first optimization information that contains the scheduling optimization operation for the case of the target scheduling policy scheduling fault, so as to generate the first scheduling update instruction corresponding to the scheduling optimization operation, which enables the scheduling update of an actual scheduling task in the case of faults, thereby solving the problem that the existing scheduling simulation method cannot handle and alleviate the fault problem existing in the logistics task, and improving the work efficiency, work quality and reliability of the actual stereoscopic warehouse scheduling.

In some embodiments, the apparatus further comprises a receiving module for receiving the first optimization information sent by the stereoscopic warehouse simulation model management server, wherein the first optimization information is obtained by means of identification by the stereoscopic warehouse simulation model management server of a fault produced during the execution of the target scheduling policy by the actual stereoscopic warehouse management server.

In some embodiments, the sending module is further used for sending the first scheduling update instruction to the actual stereoscopic warehouse management server.

In some embodiments, the apparatus further comprises an acquisition module for acquiring multiple types of to-be-verified scheduling policies; the sending module that is further used for sending, according to each type of to-be-verified scheduling policy, a scheduling instruction corresponding to the to-be-verified scheduling policy to the stereoscopic warehouse simulation model management server; the acquisition module that is further used for acquiring completion time for each to-be-verified scheduling policy to execute scheduling simulation in the stereoscopic warehouse simulation model management server; and a first determination module for determining the target scheduling policy among the multiple to-be-verified scheduling policies according to the completion time of scheduling simulation for each to-be-verified scheduling policy.

In some embodiments, the first determination module is specifically used for determining, among the multiple to-be-verified scheduling policies, a to-be-verified scheduling policy with the shortest completion time of scheduling simulation as the target scheduling policy.

In some embodiments, the responding and determining module is further used for, for each to-be-verified scheduling policy, responding to second optimization information corresponding to the to-be-verified scheduling policy, and determining a corresponding second scheduling update instruction, wherein the second optimization information comprises a scheduling optimization operation for the case of a simulation fault of the corresponding to-be-verified scheduling policy; and the sending module is further used for sending the second scheduling update instruction corresponding to the to-be-verified scheduling policy to the stereoscopic warehouse simulation model management server.

In a third aspect, the present application provides a scheduling method applied to a stereoscopic warehouse simulation model management server, comprising: determining first optimization information according to fault information sent by an actual stereoscopic warehouse management server, wherein the first optimization information comprises a scheduling optimization operation for the case of a target scheduling policy scheduling fault; and feeding the first optimization information back to a warehouse management server to cause the warehouse management server to determine a first scheduling update instruction according to the first optimization information.

In the technical solution of the embodiments of the present application, this solution determines the first optimization information by the stereoscopic warehouse simulation model management server based on the fault information generated by the actual stereoscopic warehouse management server in the actual scheduling process, and then feeds the first optimization information back to the warehouse management server, so that the warehouse management server can generate the corresponding scheduling update control instruction according to the scheduling optimization operation in the first optimization information, which enables the scheduling update in the case of the actual scheduling, thereby solving the problem that the existing scheduling simulation method cannot handle and alleviate the fault problem in the logistics task, thus improving the work efficiency, work quality and reliability of the actual stereoscopic warehouse scheduling.

In some embodiments, the method further comprises: establishing a stereoscopic warehouse simulation model, wherein the stereoscopic warehouse simulation model comprises a simulation layout of a stereoscopic warehouse, various simulated components of the stereoscopic warehouse, a set of multiple handleable-fault identifiers, and a handling policy corresponding to each fault identifier. This embodiment improves simulation efficiency by establishing the stereoscopic warehouse simulation model in advance in the stereoscopic warehouse simulation model management server.

In some embodiments, the method further comprises: performing encapsulation processing on the stereoscopic warehouse simulation model and/or the various simulated components in the stereoscopic warehouse simulation model. This embodiment performs encapsulation processing on the stereoscopic warehouse simulation model and/or the various simulated components in the stereoscopic warehouse simulation model, thereby improving the portability of the simulation model and improving the efficiency of establishing the simulation model.

In some embodiments, the fault information comprises a fault identifier, and prior to said determining first optimization information according to fault information sent by an actual stereoscopic warehouse management server, the method further comprises: executing, when a fault identifier identical to the fault identifier sent by the actual stereoscopic warehouse management server is found in the set of handleable-fault identifiers, the step of determining the first optimization information according to the fault information sent by the actual stereoscopic warehouse management server, wherein the set of handleable-fault identifiers contains multiple handleable-fault identifiers, and the set of handleable-fault identifiers is obtained through setting when the stereoscopic warehouse simulation model is established.

In some embodiments, the method further comprises: issuing a stereoscopic warehouse fault alarm when no fault identifier identical to the fault identifier sent by the actual stereoscopic warehouse management server is found in the set of handleable-fault identifiers. This embodiment determines, based on whether the fault identifier sent by the actual stereoscopic warehouse management server is in the set of handleable-fault identifiers, whether the fault has been handled during the scheduling simulation; if it has been handled, executes the determination of the first optimization information according to the fault information, so as to achieve automatic scheduling update; and if it has not been handled, issues the stereoscopic warehouse fault alarm to remind the staff to handle it manually, thus improving the reliability and efficiency of scheduling of the stereoscopic warehouse.

In a fourth aspect, the present application provides a scheduling apparatus applied to a stereoscopic warehouse simulation model management server, the apparatus comprising a second determination module and a feedback module, the second determination module being used for determining, upon receiving fault information sent by an actual stereoscopic warehouse management server, first optimization information according to the fault information, wherein the first optimization information comprises a scheduling optimization operation for the case of a target scheduling policy scheduling fault; and the feedback module being used for feeding the first optimization information back to a warehouse management server to cause the warehouse management server to determine a first scheduling update instruction according to the first optimization information so that the actual stereoscopic warehouse management server executes a corresponding scheduling update operation according to the first scheduling update instruction.

In some embodiments, the apparatus further comprises an establishment module for establishing a stereoscopic warehouse simulation model, wherein the stereoscopic warehouse simulation model comprises a simulation layout of a stereoscopic warehouse, various simulated components of the stereoscopic warehouse, a set of multiple handleable-fault identifiers, and a handling policy corresponding to each fault identifier.

In some embodiments, the apparatus further comprises an encapsulation module for performing encapsulation processing on the stereoscopic warehouse simulation model and/or the various simulated components in the stereoscopic warehouse simulation model.

In some embodiments, the fault information comprises a fault identifier, and the apparatus further comprises an execution module for executing, when a fault identifier identical to the fault identifier sent by the actual stereoscopic warehouse management server is found in the set of handleable-fault identifiers, the step of determining the first optimization information according to the fault information sent by the actual stereoscopic warehouse management server, wherein the set of handleable-fault identifiers contains multiple handleable-fault identifiers, and the set of handleable-fault identifiers is obtained through setting when the stereoscopic warehouse simulation model is established.

In some embodiments, the apparatus further comprises an alarm module for issuing a stereoscopic warehouse fault alarm when no fault identifier identical to the fault identifier sent by the actual stereoscopic warehouse management server is found in the set of handleable-fault identifiers.

In a fifth aspect, the present application provides a scheduling system, the scheduling system comprises a warehouse management server, a stereoscopic warehouse simulation model management server and an actual stereoscopic warehouse management server, a stereoscopic warehouse simulation model corresponding to an actual stereoscopic warehouse being pre-established in the stereoscopic warehouse simulation model management server, and the warehouse management server, the stereoscopic warehouse simulation model management server, and the actual stereoscopic warehouse management server being communicatively connected; the warehouse management server being used for sending a scheduling instruction to the actual stereoscopic warehouse management server and the stereoscopic warehouse simulation model management server, wherein the scheduling instruction corresponds to a target scheduling policy; the stereoscopic warehouse simulation model management server being used for executing the target scheduling policy using the stereoscopic warehouse simulation model according to the received scheduling instruction; the actual stereoscopic warehouse management server being used for executing a corresponding scheduling operation according to the received scheduling instruction to execute the target scheduling policy and sending fault information to the stereoscopic warehouse simulation model management server when a fault occurs during the execution of the target scheduling policy; the stereoscopic warehouse simulation model management server being further used for determining, upon receiving the fault information sent by the actual stereoscopic warehouse management server, first optimization information according to the fault information, and feeding the first optimization information back to the warehouse management server; the warehouse management server being further used for generating a first scheduling update instruction according to the first optimization information and sending the first scheduling update instruction to the actual stereoscopic warehouse management server; and the actual stereoscopic warehouse management server being further used for executing a corresponding scheduling update operation according to the first scheduling update instruction.

In the scheduling system designed above, the warehouse management server first sends the scheduling instruction corresponding to the target scheduling policy to the actual stereoscopic warehouse management server and the stereoscopic warehouse simulation model management server, thus causing the actual stereoscopic warehouse management server to control an actual operating device to execute the corresponding scheduling operation to execute this target scheduling policy, and when a fault occurs in the scheduling process, the warehouse management server responds to the first optimization information that contains the scheduling optimization operation for the case of the target scheduling policy scheduling fault, so as to generate the first scheduling update instruction corresponding to the scheduling optimization operation, which enables the scheduling update of an actual scheduling task in the case of faults, thereby solving the problem that the existing scheduling simulation method cannot handle and alleviate the fault problem existing in the logistics task, and improving the work efficiency, work quality and reliability of the actual stereoscopic warehouse scheduling.

In a sixth aspect, the present application provides an electronic device comprising a memory and a processor, the memory storing a computer program, and the processor, when executing the computer program, executes the method as described in the first aspect, or in any of the optional implementations of the first aspect, or in the third aspect, or in any of the optional implementations of the third aspect.

In a seventh aspect, the present application provides a non-transitory computer-readable storage medium having a computer program stored thereon, the computer program, when executed by a processor, executes the method as described in the first aspect, or in any of the optional implementations of the first aspect, or in the third aspect, or in any of the optional implementations of the third aspect.

In an eighth aspect, the present application provides a computer program product, the computer program product, when run on a computer, causes the computer to execute the method as described in the first aspect, or in any of the optional implementations of the first aspect, or in the third aspect, or in any of the optional implementations of the third aspect.

The above description is only an overview of the technical solutions of the embodiments of the present application, which can be implemented according to the contents of the specification in order for more clear understanding of the technical means of the embodiments of the present application; and in order to make the above and other objectives, features and advantages of the embodiments of the present application more obvious and understandable, specific implementations of the present application are exemplified below.

DESCRIPTION OF DRAWINGS

By reading the detailed description of the preferred implementations below, various other advantages and benefits will become apparent to those of ordinary skill in the art. The accompanying drawings are for the purpose of illustrating the preferred implementations only and are not to be considered a limitation of the present application. Moreover, in all of the accompanying drawings, the same parts are indicated by the same reference numerals. In the accompanying drawings.

Figure 1:
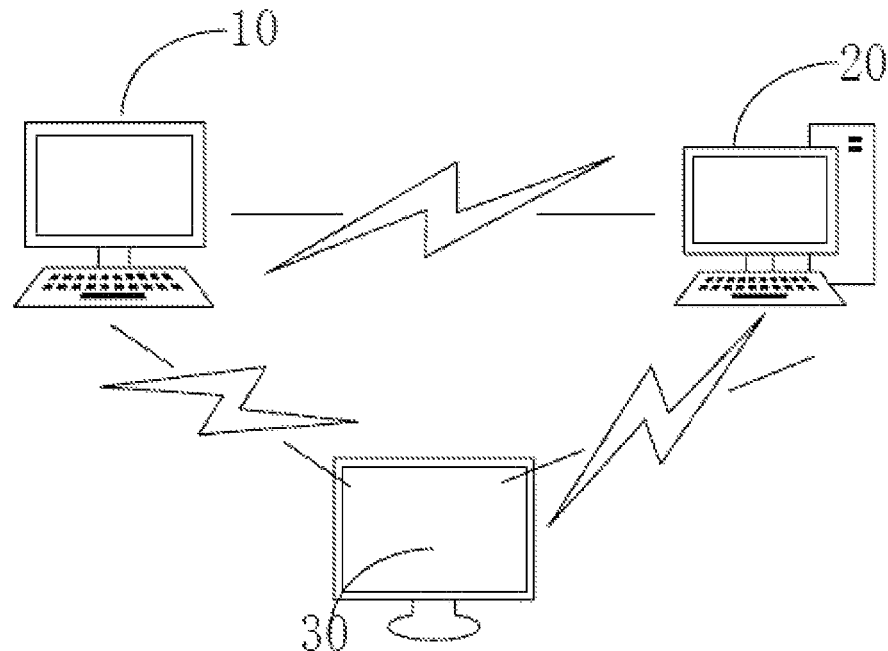
FIG. 1 is a schematic structural view of a scheduling system provided in the present application.

The reference numerals in the Detailed Description are as follows:
- 10—Warehouse management server;
- 20—Stereoscopic warehouse simulation model management server;
- 30—Actual stereoscopic warehouse management server;
- 600—Sending module;
- 610—Responding and determining module;
- 620—Receiving module;
- 630—Acquisition module;
- 640—First determination module;
- 1000—Second determination module;
- 1100—Feedback module;
- 1200—Establishment module;
- 1300—Encapsulation module;
- 1400—Execution module; 1
- 500—Alarm module;
- 11—Electronic device;
- 1101—Processor;
- 1102—Memory;
- 1103—Communication bus.

DETAILED DESCRIPTION

Embodiments of the technical solutions of the present application will be described in detail below in conjunction with the drawings. The following embodiments are only used to more clearly illustrate the technical solution of the present application, and therefore are only used as examples and cannot be used to limit the scope of protection of the present application.

Unless otherwise defined, all technical and scientific terms used herein have the same meaning as commonly understood by those skilled in the art belonging to the technical field of the present application; the terms used herein are intended only for the purpose of describing specific embodiments and are not intended to limit the present application; the terms "including" and "having" and any variations thereof in the specification and the claims of the present application and in the description of drawings above are intended to cover non-exclusive inclusion.

In the description of the embodiments of the present application, the technical terms "first", "second", and the like are used only to distinguish between different objects, and are not to be understood as indicating or implying a relative importance or implicitly specifying the number, particular order, or primary and secondary relation of the technical features indicated. In the description of the embodiments of the present application, the meaning of "a plurality of" is two or more, unless otherwise explicitly and specifically defined.

Reference herein to "an embodiment" means that a particular feature, structure, or characteristic described in connection with the embodiment can be included in at least one embodiment of the present application. The appearance of this phrase in various places in the specification does not necessarily refer to the same embodiment, nor is it a separate or alternative embodiment that is mutually exclusive with other embodiments. It is explicitly and implicitly understood by those skilled in the art that the embodiments described herein may be combined with other embodiments.

In the description of the embodiments of the present application, the term "and/or" is simply a description of an association of associated objects, which indicates that there may exist three relationships, for example, A and/or B may mean: the presence of A, the presence of both A and B, and the presence of B. In addition, the character "/" herein generally means that the associated objects before and after it are in an "or" relationship.

In the description of the embodiments of the present application, the term "a plurality of" refers to two or more (including two), and similarly, "multiple groups" refers to two or more (including two) groups, and "multiple sheets" refers to two or more (including two) sheets.

In the description of the embodiments of the present application, the orientation or position relationship indicated by the technical terms "center", "longitudinal", "transverse", "length", "width", "thickness", "upper," "lower," "front," "back," "left," "right," "vertical," "horizontal," "top," "bottom," "inner," "outer," "clockwise," "counterclockwise," "axial", "radial", "circumferential", etc. are based on the orientation or position relationship shown in the drawings and are intended to facilitate the description of the embodiments of the present application and simplify the description only, rather than indicating or implying that the apparatuses or elements referred to must have a particular orientation or be constructed and operated in a particular orientation, and therefore are not to be interpreted as limitations on the embodiments of the present application.

In the description of the embodiments of the present application, unless otherwise expressly specified and limited, the technical terms "mount," "join," "connect," "fix," etc. should be understood in a broad sense, such as, a fixed connection, a detachable connection, or an integral connection; a mechanical connection, or an electrical connection; a direct connection, an indirect connection through an intermediate medium, an internal connection of two elements, or interaction between two elements. For those of ordinary skill in the art, the specific meanings of the above terms in the embodiments of the present application can be understood according to specific situations.

In the existing warehouse management, especially in the management of automatic stereoscopic warehouses, it is generally necessary to carry out advance simulation scheduling of the planning and scheduling scheme of warehouse operations to reasonably analyze and improve the calculation and scheduling scheme.

The inventors note that the existing warehouse management scheduling simulation methods generally perform simulation by establishing a stereoscopic warehouse simulation model and then loading different logistics tasks into the stereoscopic warehouse simulation model, so that the time consumption and warehouse efficiency of each logistics task can be calculated, and then the logistics task can be analyzed and evaluated. However, the existing warehouse management scheduling simulation methods do not optimize or improve the possibly encountered fault problems during the execution of logistics tasks, which makes it impossible to handle the fault problems in a timely manner during the execution of logistics tasks after the establishment of a real stereoscopic warehouse, thus reducing the execution efficiency and work quality of logistics tasks.

To address the above problem, the inventors found through research that it is possible to introduce random faults in the simulation stage to perform simulation of updated warehouse positions in various fault situations, thereby performing simulation of scheduling updates in various fault situations in order to find the optimal updated warehouse positions; on this basis, if faults occur in actual scheduling situations, the faults of actual scheduling can be introduced into the simulation model so that the scheduling update can be performed through the optimal updated warehouse positions found by the simulation model in the simulation stage, thus realizing the handling of fault problems of actual scheduling, which in turn can improve the execution efficiency and work quality of logistics tasks.

Based on the above findings, after in-depth research, the inventors have designed a scheduling method, apparatus, and system, an electronic device, and a storage medium, which, during the scheduling simulation stage as well as the actual scheduling stage, can solve the fault problems arising in the logistics tasks and optimize the update of logistics scheduling, thus improving the execution efficiency and the work quality of the logistics tasks.

The present application provides a scheduling system, as shown in FIG. 1, which includes a warehouse management server 10, a stereoscopic warehouse simulation model management server 20, and an actual stereoscopic warehouse management server 30, wherein the warehouse management server 10, the stereoscopic warehouse simulation model management server 20, and the actual stereoscopic warehouse management server 30 are communicatively connected.

The warehouse management server 10 may include a warehouse management system (WMS) and a warehouse control system (WCS). As a possible implementation, the warehouse management system (WMS) and the warehouse control system (WCS) can be integrated in one server; and as another possible implementation, there may be multiple warehouse management servers 10, and the warehouse management system (WMS) and the warehouse control system (WCS) can be deployed in different servers.

There is a stereoscopic warehouse simulation model corresponding to an actual stereoscopic warehouse that is established in the stereoscopic warehouse simulation model management server 20, wherein the stereoscopic warehouse simulation model is established by 1:1 simulation of the layout and components of the actual stereoscopic warehouse, thereby ensuring that the stereoscopic warehouse simulation model can fully demonstrate the layout. Specifically, the stereoscopic warehouse simulation model can be provided with the devices and facilities in the actual stereoscopic warehouse, such as stacker cranes, warehouse positions, pallets, loading and unloading stations, and so on.

In the scheduling system designed above, during the simulation stage, multiple to-be-verified scheduling policies, such as a random policy, a row policy, a column policy, etc., can be imported into the warehouse management server 10, and on this basis, the scheduling simulation verification of each to-be-verified scheduling policy can be performed through the interaction between the warehouse management server 10 and the stereoscopic warehouse simulation model management server 20, and the scheduling efficiency and thus quality of each to-be-verified scheduling policy can be evaluated, thereby finding the target scheduling policy that applies to actual scheduling. In the process of finding the target scheduling policy or after finding the target scheduling policy, the scheduling system designed in this solution can perform fault introduction in the process of scheduling policy verification through the stereoscopic warehouse simulation model management server 20, so as to perform the scheduling operation according to the introduced faults to optimize the updated simulated scheduling, and hence the optimal scheduling operations corresponding to the target scheduling policy under different fault conditions can be found. Here, the row policy indicates a way of placing materials in sequence by row in which the palletizer first places materials in sequence into all the warehouse positions in the first row, and then places materials in sequence into all the warehouse positions in the second row; and the column policy indicates a way of placing the materials in sequence by column in which the palletizer first places materials in sequence into all the warehouse positions in the first column, and then places the remaining materials in sequence into all the warehouse positions in the second column.

In the actual stereoscopic warehouse scheduling stage, the warehouse management server 10 can send a corresponding scheduling instruction to the stereoscopic warehouse simulation model management server 20 and the actual stereoscopic warehouse management server 30 according to the determined target scheduling policy, so that the actual stereoscopic warehouse management server 30 executes the target scheduling policy, and if a fault occurs during the execution of the target policy in the actual stereoscopic warehouse, the actual stereoscopic warehouse management server 30 sends fault information to the stereoscopic warehouse simulation model management server 20, and then the stereoscopic warehouse simulation model management server 20 identifies first optimization information corresponding to the fault based on the fault information, and feeds the first optimization information back to the warehouse management server 10, where the first optimization information contains information about a scheduling optimization operation for the case of an actual scheduling fault, so that the warehouse management server 10 can generate a first scheduling update instruction corresponding to the scheduling optimization operation based on the first optimization information, and thus achieve the control of the scheduling optimization operation based on the first scheduling update instruction, thus realizing the scheduling update in the case of faults.

In the scheduling system designed above, this solution sends the scheduling instruction for the target scheduling policy to the actual stereoscopic warehouse management server 30 and the stereoscopic warehouse simulation model management server 20 through the warehouse management server 10, and the actual stereoscopic warehouse management server 30 executes the corresponding scheduling operation according to the scheduling instruction to execute that target scheduling policy, and sends fault information to the stereoscopic warehouse simulation model management server 20 when a fault occurs during the execution of the target scheduling policy, so that the stereoscopic warehouse simulation model management server 20 determines the first optimization information based on the fault information, and feeds the first optimization information back to the warehouse management server 10, and the warehouse management server 10 responds to the first optimization information that contains the scheduling optimization operation for the case of the target scheduling policy scheduling fault, so as to generate the first scheduling update instruction corresponding to the scheduling optimization operation, which enables the scheduling update of an actual scheduling task in the case of faults, thereby solving the problem that the existing scheduling simulation method cannot handle and alleviate the fault problem existing in the logistics task, and improving the work efficiency, work quality and reliability of the actual stereoscopic warehouse scheduling.

Figure 2:
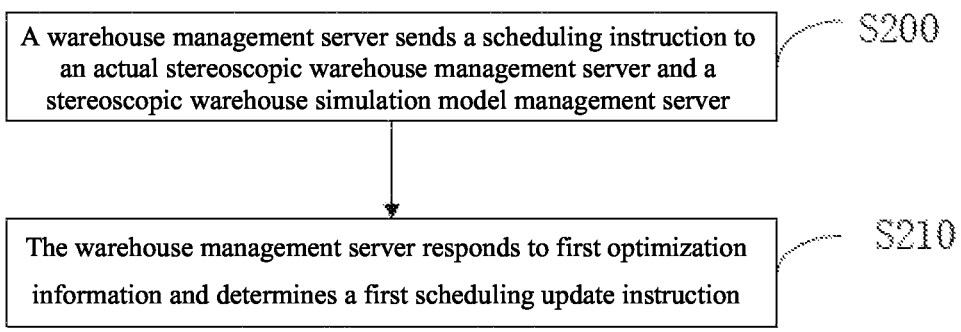
FIG. 2 is a first flow chart of a scheduling method provided in the present application.

The present application provides a scheduling method, wherein the method is applicable in the aforementioned warehouse management server, and as shown in FIG. 2, the scheduling method can include the following steps:

Step S200: a warehouse management server sends a scheduling instruction to an actual stereoscopic warehouse management server and a stereoscopic warehouse simulation model management server.

Step S210: the warehouse management server responds to first optimization information and determines a first scheduling update instruction.

In the above implementations, the actual stereoscopic warehouse management server refers to a server that monitors and controls an actual stereoscopic warehouse device, and the actual stereoscopic warehouse is an integration of scheduling devices employed in the actual application scheduling process, for example, the actual warehouse position may include scheduling devices such as actual stacker cranes, actual warehouse positions, actual pallets, loading and unloading stations, and the actual layout of the actual stacker cranes, loading and unloading stations, and so on. The stereoscopic warehouse simulation model management server refers to a server with a warehouse simulation model, wherein the stereoscopic warehouse simulation model is established by 1:1 simulation of the layout and components of the actual stereoscopic warehouse. Specifically, the stereoscopic warehouse simulation model may include a stacker crane simulation model, an actual warehouse position simulation model, an actual pallet simulation model, a loading and unloading station simulation model, and so on.

The scheduling instruction refers to a control instruction corresponding to the current scheduling execution operation, and the scheduling instruction can be generated based on the target scheduling policy, wherein the target scheduling policy can be set in advance and contains a variety of scheduling operation instructions for materials, such as information on the fetching position of the materials, information on the storage warehouse position of the materials after fetching, the path the palletizer takes to move the materials from the fetching position to the storage warehouse position, and the like. Here, the target scheduling policy can be stored in the warehouse management system (WMS), and the warehouse management system (WMS) can send the target scheduling policy to the warehouse control system (WCS), and a corresponding scheduling instruction is generated by the warehouse control system (WCS) based on the target scheduling policy, and then the generated scheduling instruction is sent to the actual stereoscopic warehouse management server and the stereoscopic warehouse simulation model management server.

On this basis, the actual stereoscopic warehouse management server controls according to the received scheduling instruction the actual operating device to execute the scheduling operation corresponding to the scheduling instruction, so as to execute the target scheduling policy. For example, the actual stereoscopic warehouse management server controls the palletizer to transport, in accordance with the operation path in the scheduling policy, materials from the fetching position to the storage warehouse position and store them into the warehouse.

During the execution of the target policy by the actual stereoscopic warehouse, if a fault occurs, the warehouse management server can respond to first optimization information, where the fault during the execution by the actual stereoscopic warehouse can be, for example, a fetching position error, a placing warehouse position fault, and the like; the first optimization information includes a scheduling optimization operation for the case of a target scheduling policy scheduling fault, that is, a scheduling optimization operation for the case of a fetching position error or a scheduling optimization operation for the case of a placing warehouse position fault.

Then, the warehouse management server generates a scheduling operation control command corresponding to the optimization operation based on the scheduling optimization operation in the first optimization information, i.e., the first scheduling update instruction. For example, the original scheduling instruction is to transport materials from the fetching position to the storage warehouse position A1 and store them into the warehouse; however, due to a fault at the warehouse position A1, the materials cannot be stored into the warehouse, then the first optimization information that can be generated based on the fault may contain information about the updated warehouse position, such as the warehouse position A2, and then the warehouse management server can generate the first scheduling update instruction based on the information about the updated warehouse position A2, i.e., generate an operation command to store the materials into the warehouse position A2, so that the handling of scheduling faults can be realized in the case of actual scheduling faults (warehouse position A1 faults).

In the scheduling method designed above, the warehouse management server first sends the scheduling instruction corresponding to the target scheduling policy to the actual stereoscopic warehouse management server and the stereoscopic warehouse simulation model management server, thus causing the actual stereoscopic warehouse management server to control an actual operating device to execute the corresponding scheduling operation to execute this target scheduling policy, and when a fault occurs in the scheduling process, the warehouse management server responds to the first optimization information that contains the scheduling optimization operation for the case of the target scheduling policy scheduling fault, so as to generate the first scheduling update instruction corresponding to the scheduling optimization operation, which enables the scheduling update of an actual scheduling task in the case of faults, thereby solving the problem that the existing scheduling simulation method cannot handle and alleviate the fault problem existing in the logistics task, and improving the work efficiency, work quality and reliability of the actual stereoscopic warehouse scheduling.

According to some embodiments of the present application, the aforementioned first optimization information can be obtained by means of the sending by the stereoscopic warehouse simulation model management server. Specifically, when a fault occurs in the process of scheduling the actual stereoscopic warehouse, an operating device corresponding to the actual stereoscopic warehouse can upload the fault information to the actual stereoscopic warehouse management server, and then the actual stereoscopic warehouse management server sends the fault information to the stereoscopic warehouse simulation model management server, and the stereoscopic warehouse simulation model management server identifies the fault information sent by the actual stereoscopic warehouse, so that the first optimization information corresponding to this fault can be determined based on the identified fault information, and finally, the stereoscopic warehouse simulation model management server can feed the determined first optimization information back to the warehouse management server.

It should be noted that, in addition to the above manners, the actual stereoscopic warehouse management server can upload the fault information directly to the warehouse management server, and the warehouse management server can directly identify the fault information to generate the first optimization information and the corresponding first scheduling update instruction.

In the embodiments of the present application, the corresponding first optimization information is identified by the stereoscopic warehouse simulation model management server based on the fault information sent by the actual stereoscopic warehouse management server, so as to feed the first optimization information back to the warehouse management server, and then generate the corresponding first scheduling update instruction, thereby realizing the scheduling update processing in the case of actual scheduling faults.

Figure 3:
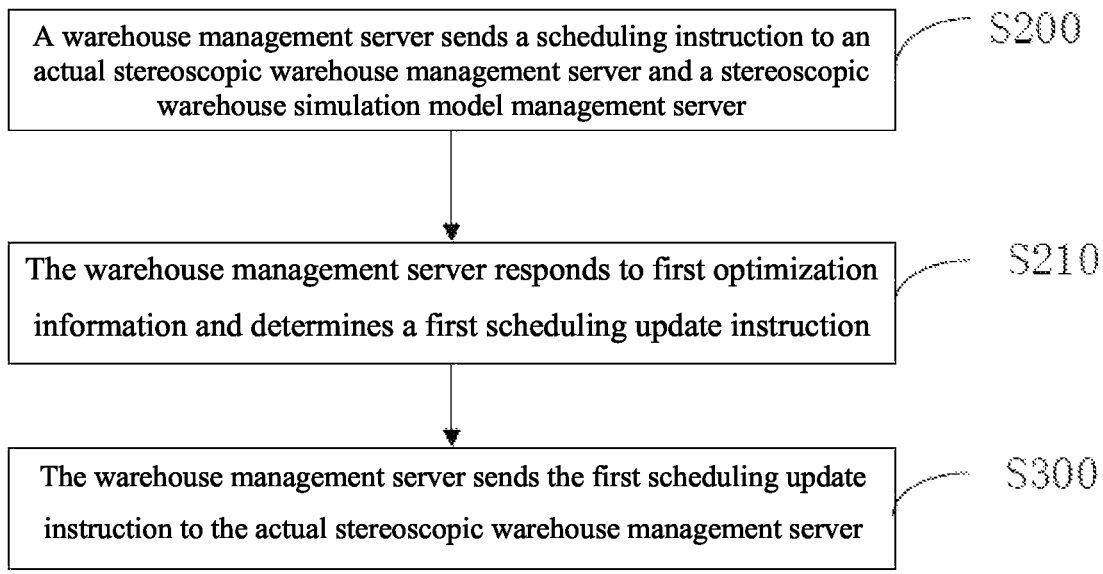
FIG. 3 is a second flow chart of a scheduling method provided in the present application.

According to some embodiments of the present application, after the first scheduling update instruction is determined in the aforementioned step S210, as shown in FIG. 3, this solution may also include the following steps:

Step S300: the warehouse management server sends the first scheduling update instruction to the actual stereoscopic warehouse management server.

In the above implementation, the first scheduling update instruction determined by the warehouse management server based on first optimized warehouse position information may be sent to the actual stereoscopic warehouse management server, so that the actual stereoscopic warehouse management server may execute the updated scheduling operation according to the first scheduling update instruction. For example, the aforementioned warehouse management server can generate the first scheduling update instruction based on information about the updated warehouse position A2 and can send it to the actual stereoscopic warehouse management server, so that the actual stereoscopic warehouse management server can control the palletizer to place the fetched materials into the updated warehouse position A2, so as to avoid placing them into the warehouse position A1 to which storage cannot be performed, thereby solving the actual scheduling fault.

In the embodiments of the present application, the first scheduling update instruction is sent to the actual stereoscopic warehouse management server, so that the actual stereoscopic warehouse management server executes the updated scheduling operation according to the first scheduling update instruction, so as to solve the fault existing in the actual scheduling.

Figure 4:
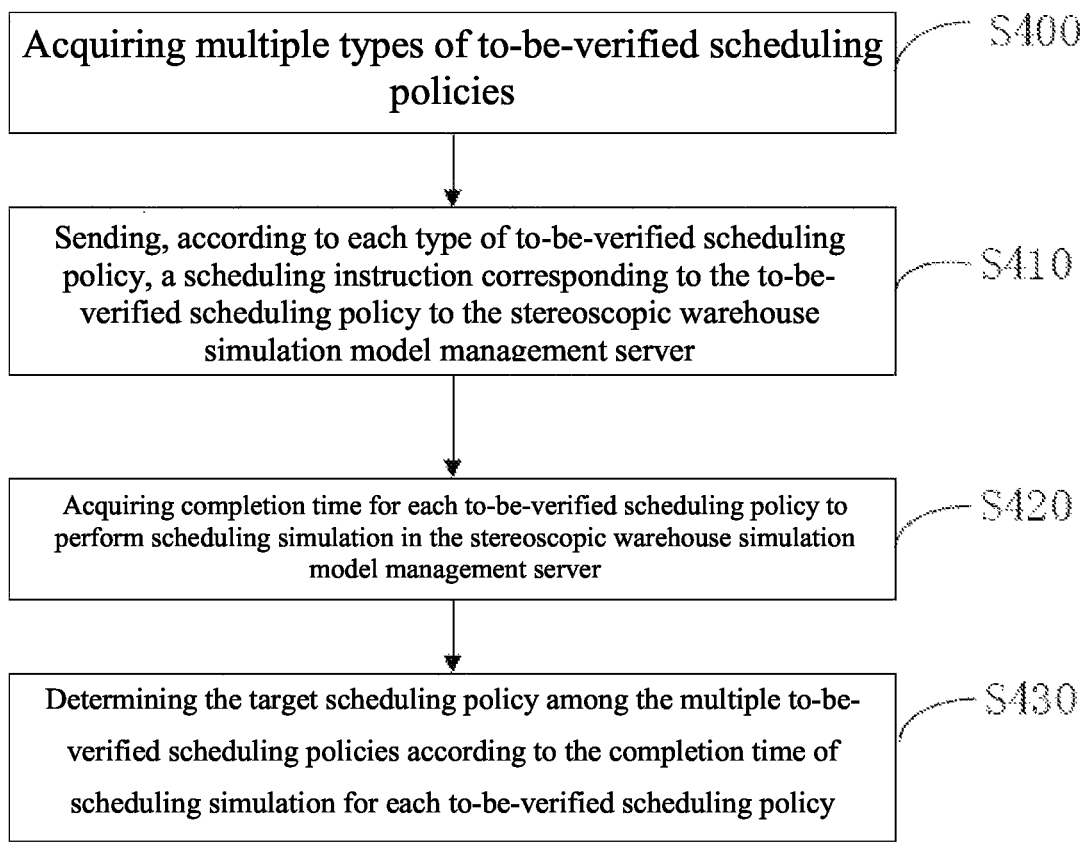
FIG. 4 is a third flow chart of a scheduling method provided in the present application.

According to some embodiments of the present application, the target scheduling policy described earlier can be obtained through selection among multiple scheduling policies after the simulation and comparison thereof, as shown in FIG. 4, which may specifically include the following steps:

Step S400: acquiring multiple types of to-be-verified scheduling policies.

Step S410: sending, according to each type of to-be-verified scheduling policy, a scheduling instruction corresponding to the to-be-verified scheduling policy to the stereoscopic warehouse simulation model management server.

Step S420: acquiring completion time for each to-be-verified scheduling policy to execute scheduling simulation in the stereoscopic warehouse simulation model management server.

Step S430: determining the target scheduling policy among the multiple to-be-verified scheduling policies according to the completion time of scheduling simulation for each to-be-verified scheduling policy.

In the above implementation, the warehouse management server may acquire multiple types of to-be-verified scheduling policies in advance, wherein the multiple types of to-be-verified scheduling policies may be obtained through edition and importation in advance. For example, the staff may edit and import the designed multiple types of to-be-verified scheduling policies into the warehouse management server, so that the warehouse management server acquires the multiple types of to-be-verified scheduling policies. The multiple types of to-be-verified scheduling policies can be, for example, a random policy, a row policy, a column policy, and so on, wherein the row policy indicates a way of placing materials in sequence by row in which the palletizer first places materials in sequence into all the warehouse positions in the first row, and then places materials in sequence into all the warehouse positions in the second row; the column policy indicates a way of placing the materials in sequence by column in which the palletizer first places materials in sequence into all the warehouse positions in the first column, and then places the remaining materials in sequence into all the warehouse positions in the second column; and the random policy indicates a way in which the palletizer places the materials in sequence into all the warehouse positions at random.

On the basis of the multiple types of to-be-verified scheduling policies obtained above, the warehouse management server can send, according to each type of to-be-verified scheduling policy, a scheduling instruction corresponding to the to-be-verified scheduling policy to the stereoscopic warehouse simulation model management server, wherein the to-be-verified scheduling policy includes multiple scheduling operations, and the scheduling instruction corresponding to the to-be-verified scheduling policy is a control instruction corresponding to each scheduling operation, so that the stereoscopic warehouse simulation model management server can simulate and execute the corresponding scheduling operation based on the scheduling instruction of each to-be-verified scheduling policy, and thus perform scheduling simulation for each to-be-verified scheduling policy.

In the process of scheduling simulation of each to-be-verified scheduling policy by the stereoscopic warehouse simulation model management server, the stereoscopic warehouse simulation model management server can record the completion time of scheduling simulation of each to-be-verified scheduling policy and feed it back to the warehouse management server, and the warehouse management server then compares the completion time of simulation of all the to-be-verified scheduling policies to determine the target scheduling policy among the multiple to-be-verified scheduling policies. The target scheduling policy can be applied to material scheduling of the actual stereoscopic warehouse after the actual stereoscopic warehouse is established. As a possible implementation, this solution can determine, among the multiple to-be-verified scheduling policies, a to-be-verified scheduling policy with the shortest completion time of scheduling as the target scheduling policy, so that the target scheduling policy has the highest scheduling efficiency, thereby improving the efficiency of material scheduling in the actual stereoscopic warehouse. Of course, this solution can also select a to-be-verified scheduling policy with moderate scheduling time as the target scheduling policy, and the like.

The warehouse management server of the embodiments of the present application sends the scheduling instructions corresponding to the multiple types of to-be-verified scheduling policies to the stereoscopic warehouse simulation model management server for scheduling simulation and acquires the completion time of scheduling simulation for each to-be-verified scheduling policy, and finally selects the to-be-verified scheduling policy with the shortest completion time as the target scheduling policy, so that the scheduling efficiency of the scheduling policy to be finally applied in practice is the highest, thus improving the efficiency of the actual scheduling.

Figure 5:
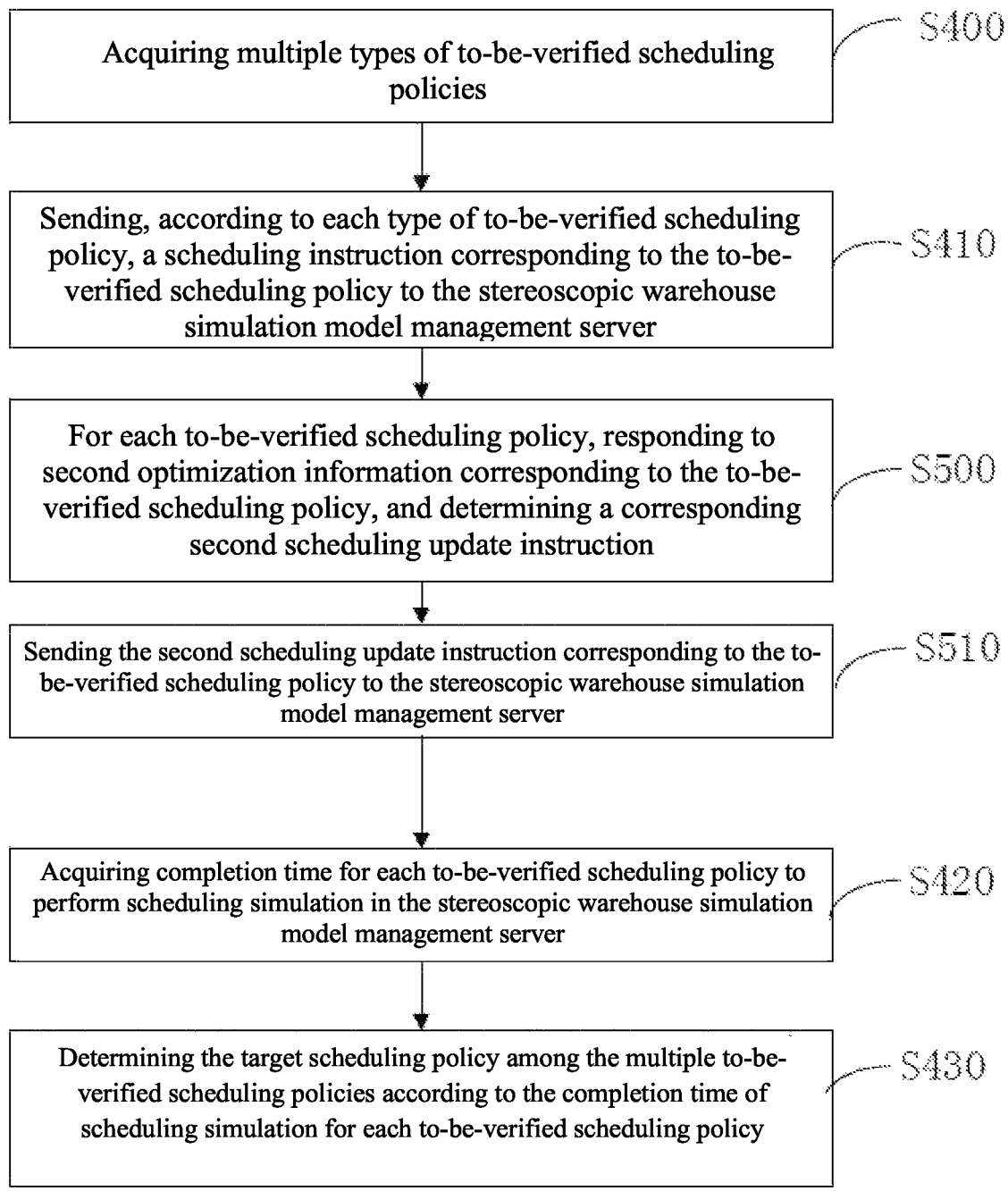
FIG. 5 is a fourth flow chart of a scheduling method provided in the present application.

According to some embodiments of the present application, prior to step S420 of acquiring completion time for each to-be-verified scheduling policy to execute scheduling simulation in the stereoscopic warehouse simulation model management server, as shown in FIG. 5, this solution may further include the following implementations:

Step S500: for each to-be-verified scheduling policy, responding to second optimization information corresponding to the to-be-verified scheduling policy, and determining a corresponding second scheduling update instruction.

Step S510: sending the second scheduling update instruction corresponding to the to-be-verified scheduling policy to the stereoscopic warehouse simulation model management server.

In the above implementations, each to-be-verified scheduling policy will inevitably have scheduling faults in the simulation process, for example, a fault that materials cannot be stored into the warehouse due to a warehouse position fault, a fetching position error, and so on. On this basis, the stereoscopic warehouse simulation model management server can identify the faults produced in the simulation process, so as to optimize the faults occurring in each to-be-verified scheduling policy in the simulation scheduling process to obtain second optimization information, wherein the second optimization information includes a scheduling optimization operation for the case of a simulation fault of the corresponding to-be-verified scheduling policy.

The stereoscopic warehouse simulation model management server can send the second optimization information to the warehouse management server, and the warehouse management server, upon receiving the second optimization information, can respond to the second optimization information and determine a second scheduling update instruction corresponding to the to-be-verified scheduling policy, wherein the second scheduling update instruction indicates a control command corresponding to the scheduling optimization operation corresponding to the second optimization information. For example, the original simulation scheduling process is to use a palletizer simulation model to transport materials from the fetching position to the storage warehouse position A3 and perform simulation and storage into the warehouse; however, due to a fault at the warehouse position A3, the materials cannot be stored into the warehouse, then the second optimization information that can be generated based on the fault may contain information about the updated warehouse position, such as the warehouse position A4, and then the warehouse management server can generate the second scheduling update instruction based on the information about the updated warehouse position A4, i.e., generate an operation command to store the materials into the warehouse position A4, so that the fault handling during the simulation scheduling can be realized in the case of simulation scheduling faults (warehouse position A3 faults).

In the above embodiment, this solution introduces faults in the simulation process of each to-be-verified scheduling policy, so as to simulate the updated scheduling after a fault occurs for each to-be-verified scheduling policy, so that the target scheduling policy finally determined can guarantee both the scheduling efficiency and the reliability of fault handling.

Figure 6:
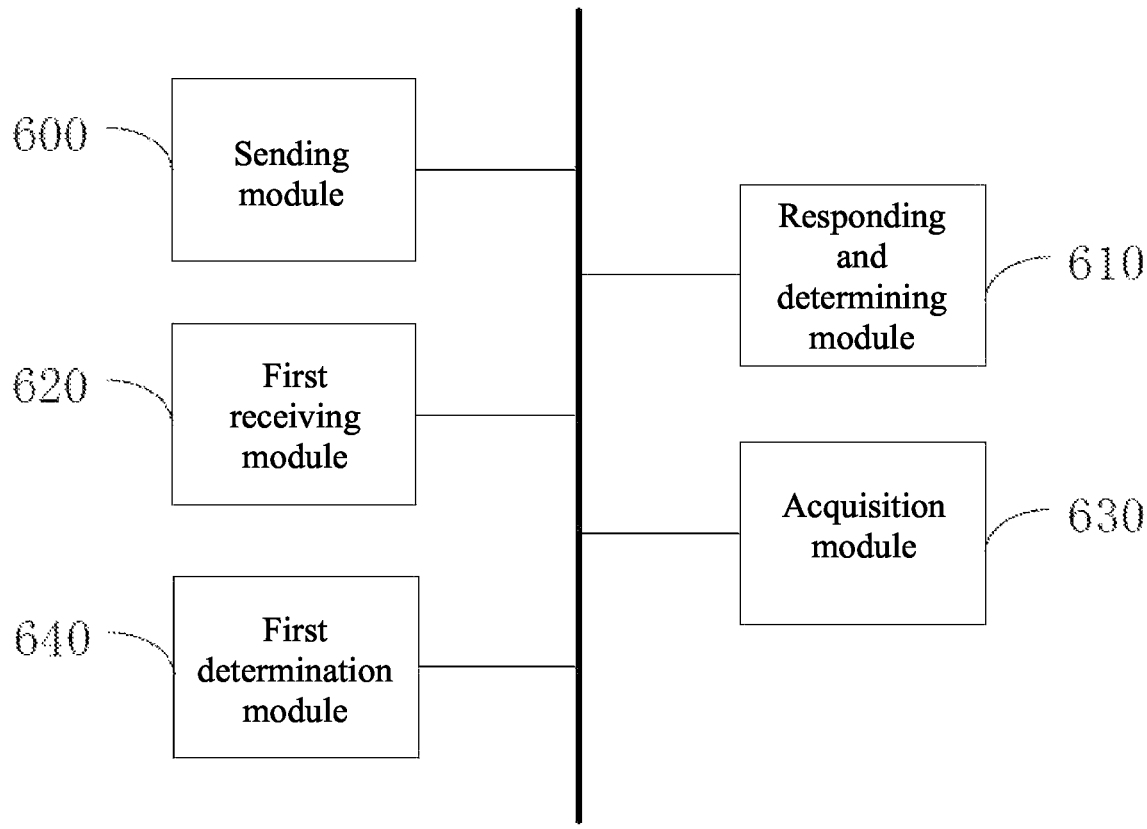
FIG. 6 is a schematic structural view of a scheduling apparatus provided in the present application.

FIG. 6 illustrates a schematic structural block diagram of a scheduling apparatus provided by the present application, and it should be understood that, this apparatus corresponds to the method embodiments executed by the warehouse management server in FIGS. 2 to 5, and is capable of executing the steps involved in the aforementioned methods. The specific functions of the apparatus can be found in the description above, and the detailed description is appropriately omitted here to avoid repetition. The apparatus comprises at least one software function module capable of being stored in memory or cured in the operating system (OS) of the apparatus in the form of software or firmware. Specifically, the apparatus comprises a sending module 600 and a responding and determining module 610, the sending module 600 being used for sending a scheduling instruction to an actual stereoscopic warehouse management server and a stereoscopic warehouse simulation model management server, wherein the scheduling instruction corresponds to a target scheduling policy; and the responding and determining module 610 being used for responding to first optimization information and determining a first scheduling update instruction, wherein the first optimization information comprises a scheduling optimization operation for the case of a target scheduling policy scheduling fault.

In the scheduling apparatus designed above, the warehouse management server first sends the scheduling instruction corresponding to the target scheduling policy to the actual stereoscopic warehouse management server and the stereoscopic warehouse simulation model management server, thus causing the actual stereoscopic warehouse management server to control an actual operating device to execute the corresponding scheduling operation to execute this target scheduling policy, and when a fault occurs in the scheduling process, the warehouse management server responds to the first optimization information that contains the scheduling optimization operation for the case of the target scheduling policy scheduling fault, so as to generate the first scheduling update instruction corresponding to the scheduling optimization operation, which enables the scheduling update of an actual scheduling task in the case of faults, thereby solving the problem that the existing scheduling simulation method cannot handle and alleviate the fault problem existing in the logistics task, and improving the work efficiency, work quality and reliability of the actual stereoscopic warehouse scheduling.

In some embodiments of the present application, the apparatus further comprises a receiving module 620 for receiving the first optimization information sent by the stereoscopic warehouse simulation model management server, wherein the first optimization information is obtained by means of identification by the stereoscopic warehouse simulation model management server of a fault produced during the execution of the target scheduling policy by the actual stereoscopic warehouse management server.

According to some embodiments of the present application, the sending module 600 is further used for sending the first scheduling update instruction to the actual stereoscopic warehouse management server.

In some embodiments of the present application, the apparatus further comprises: an acquisition module 630 for acquiring multiple types of to-be-verified scheduling policies; the sending module 600 that is further used for sending, according to each type of to-be-verified scheduling policy, a scheduling instruction corresponding to the to-be-verified scheduling policy to the stereoscopic warehouse simulation model management server; the acquisition module 630 that is further used for acquiring completion time for each to-be-verified scheduling policy to execute scheduling simulation in the stereoscopic warehouse simulation model management server; and a first determination module 640 for determining the target scheduling policy among the multiple to-be-verified scheduling policies according to the completion time of scheduling simulation for each to-be-verified scheduling policy.

In some embodiments of the present application, the first determination module 640 is specifically used for determining, among the multiple to-be-verified scheduling policies, a to-be-verified scheduling policy with the shortest completion time of scheduling simulation as the target scheduling policy.

In some embodiments of the present application, the responding and determining module 610 is further used for, for each to-be-verified scheduling policy, responding to second optimization information corresponding to the to-be-verified scheduling policy, and determining a corresponding second scheduling update instruction, wherein the second optimization information comprises a scheduling optimization operation for the case of a simulation fault of the corresponding to-be-verified scheduling policy; and the sending module 600 is further used for sending the second scheduling update instruction corresponding to the to-be-verified scheduling policy to the stereoscopic warehouse simulation model management server.

Figure 7:
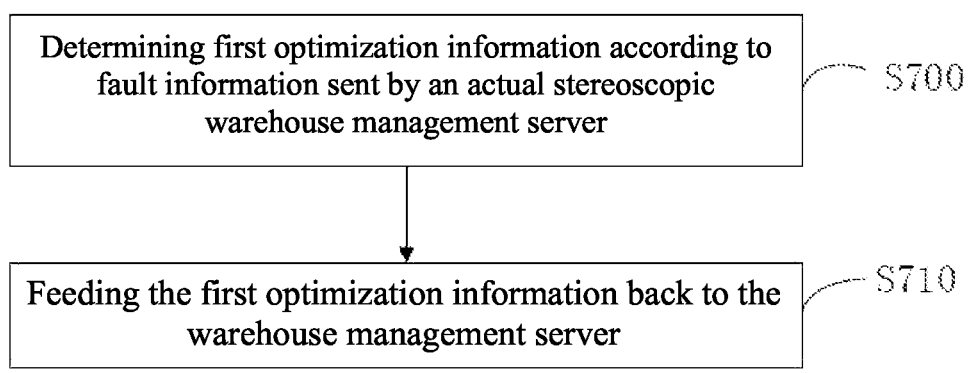
FIG. 7 is a first flow chart of another scheduling method provided in the present application.

The present application further provides a scheduling method, wherein the method is applicable in the aforementioned stereoscopic warehouse simulation model management server, and as shown in FIG. 7, the scheduling method can include the following steps:

Step S700: determining first optimization information according to fault information sent by an actual stereoscopic warehouse management server.

Step S710: feeding the first optimization information back to the warehouse management server.

In the above implementation, as described earlier, when a fault occurs during the execution of the target scheduling policy by the actual stereoscopic warehouse management server, the device in the actual stereoscopic warehouse may first upload the fault information to the actual stereoscopic warehouse management server, and the actual stereoscopic warehouse management server may send the fault information to the stereoscopic warehouse simulation model management server. Here, the fault information indicates the name of the fault operation or the name of the fault step that occurs during the actual stereoscopic warehouse scheduling, for example, materials cannot be stored due to an A warehouse position fault, or a fetching position error, and the like.

On this basis, the stereoscopic warehouse simulation model management server can determine first optimization information according to the received fault information, wherein the first optimization information comprises a scheduling optimization operation for the case of a target scheduling policy scheduling fault. Here, multiple fault types and a solution measure corresponding to each fault type can be configured in advance in the stereoscopic warehouse simulation model management server, and after the actual stereoscopic warehouse management server transmits the fault information, the corresponding solution measure can be found based on the fault information, so as to obtain the first optimization information. For example, in the case of fault information that materials cannot be stored due to an A1 warehouse position fault, a scheduling optimization operation of storing materials in the warehouse position B1 is configured in advance; or in the case of fault information for a fetching position error, a scheduling optimization operation of reacquiring a fetching position is configured in advance.

On this basis, the warehouse management server can determine the first scheduling update instruction based on the first optimization information, so as to realize the scheduling update after the fault occurs, where the process of execution by the warehouse management server has been described in the aforementioned contents, and will not be repeated here.

In the above implementation, the stereoscopic warehouse simulation model management server determines first optimization information based on the fault information generated by the actual stereoscopic warehouse management server in the actual scheduling process, and then feeds the first optimization information back to the warehouse management server, so that the warehouse management server performs scheduling update according to the first optimization information, thereby solving the problem that the existing scheduling simulation method cannot handle and alleviate the fault problem existing in the logistics task, thus improving the work efficiency, work quality and reliability of the actual stereoscopic warehouse scheduling.

Figure 8:
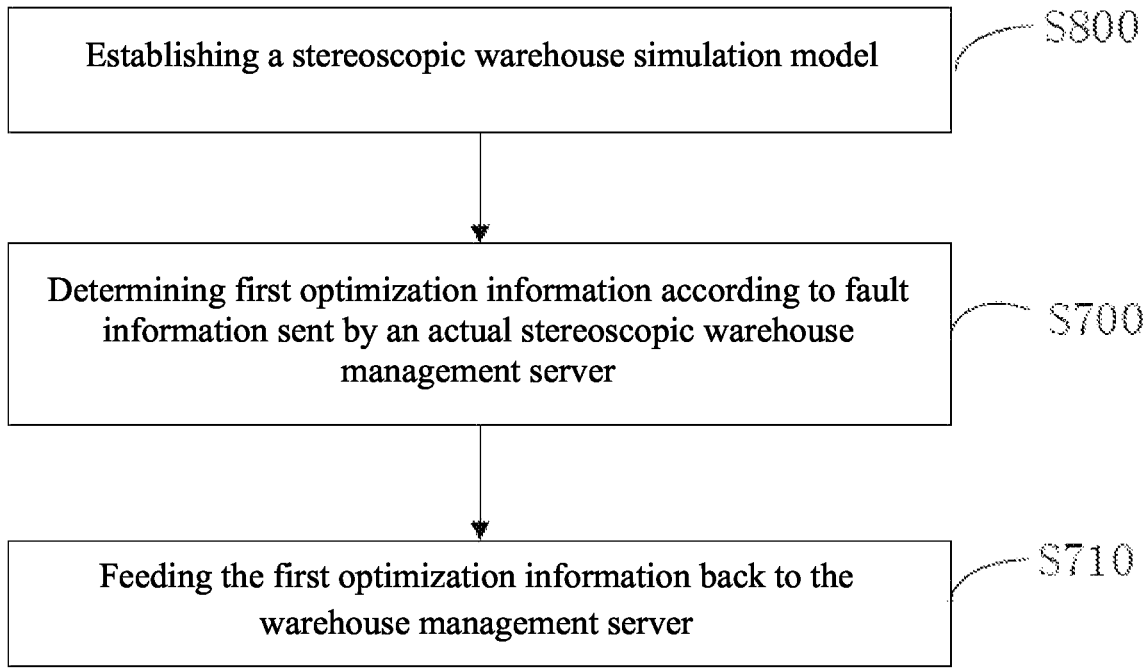
FIG. 8 is a second flow chart of another scheduling method provided in the present application.

According to some embodiments of the present application, prior to step S700, as shown in FIG. 8, this solution may further include the following steps:

Step S800: establishing a stereoscopic warehouse simulation model.

In the above implementation, the stereoscopic warehouse simulation model comprises a simulation layout of a stereoscopic warehouse, various simulated components of the stereoscopic warehouse, a set of multiple handleable-fault identifiers, a handling policy corresponding to each fault identifier, and so on. Among them, as described above, the simulated components of the stereoscopic warehouse may include devices and facilities of the stereoscopic warehouse, including but not limited to palletizers, materials, warehouse positions, and so on; the simulation layout of the stereoscopic warehouse may include the placement positions, the position distance, and so on, of devices and facilities of the actual stereoscopic warehouse; the set of multiple handleable-fault identifiers indicate a set of identifiers of handleable faults that can be simulated by the stereoscopic warehouse simulation model, for example, the handleable faults include, but are not limited to, re-storage of stacker cranes into the warehouse, loading warehouse position faults, warehouse positions being occupied, and the like, wherein each handleable fault can be assigned a corresponding fault identifier, such as a fault identifier A corresponding to re-storage of stacker cranes into the warehouse, a fault identifier B corresponding to a loading warehouse position fault, and a fault identifier C corresponding to warehouse positions being occupied. The handling policy corresponding to each type of handleable fault can be obtained empirically and the mapping can be established in advance between handling policies and the corresponding fault identifiers. For example, the handling policy for the fault identifier C is to configure the next warehouse position in the same row to be the updated warehouse position, then the mapping relationship is established between this handling policy and fault identifier C.

In addition to the above configuration, the stereoscopic warehouse simulation model may also include a stereoscopic warehouse parameter. For example, the stereoscopic warehouse parameter may include the number of lanes, the number of rows, the number of columns, the row spacing, the column spacing, the position point of the stereoscopic warehouse, the position of the unusable warehouse position, the position and height of the loading and unloading station, and the acceleration, deceleration, speed, width, height, length parameter information of the pallet and stacker crane.

In the process of establishing the stereoscopic warehouse simulation model, this solution can also perform encapsulation processing on the stereoscopic warehouse simulation model and/or the various simulated components in the stereoscopic warehouse simulation model, so that the corresponding stereoscopic warehouse and stacker crane models can be generated with one click, and thus the stereoscopic warehouse simulation model with different simulation layouts can be built quickly.

With the implementation designed above, this solution establishes the stereoscopic warehouse simulation model in advance in the stereoscopic warehouse simulation model management server, thus improving the simulation efficiency, and this solution also performs encapsulation processing on the stereoscopic warehouse simulation model and/or the various simulated components in the stereoscopic warehouse simulation model, thereby improving the portability of the simulation model and improving the efficiency of establishing the simulation model.

Figure 9:
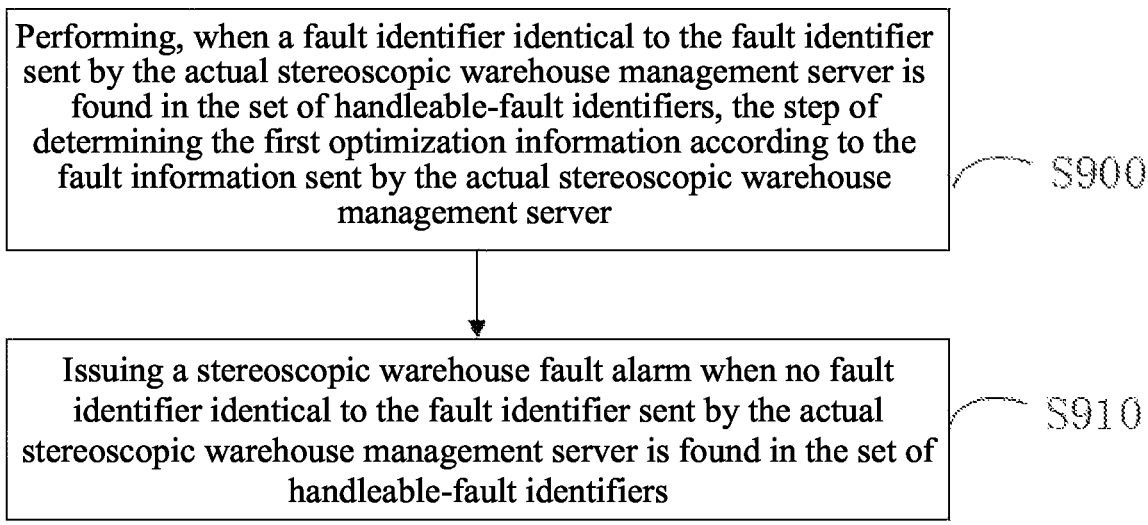
FIG. 9 is a third flow chart of another scheduling method provided in the present application.

According to some embodiments of the present application, the fault information includes a fault identifier, and prior to executing step S700, as shown in FIG. 9, this solution may further include the following steps:

Step S900: executing, when a fault identifier identical to the fault identifier sent by the actual stereoscopic warehouse management server is found in the set of handleable-fault identifiers, the step of determining the first optimization information according to the fault information sent by the actual stereoscopic warehouse management server.

Step S910: issuing a stereoscopic warehouse fault alarm when no fault identifier identical to the fault identifier sent by the actual stereoscopic warehouse management server is found in the set of handleable-fault identifiers.

In the above implementation, as described earlier, the set of identifiers of handleable faults and the handling policy (solution measure) corresponding to each fault identifier are configured in advance in the stereoscopic warehouse simulation model management server, and on this basis, upon receiving a fault identifier sent from the actual stereoscopic warehouse management server, the stereoscopic warehouse simulation model management server can search in the set of handleable-fault identifiers to see whether there is an identical fault identifier in this set. If there is, it means that the fault has been handled during the scheduling simulation and the stereoscopic warehouse simulation model management server can handle this fault, so it executes the step of determining the first optimization information based on the fault information; or if no fault identifier identical to the fault identifier sent by the actual stereoscopic warehouse management server is found in the set of handleable-fault identifiers, it means that this fault is a new fault and has not been simulated and handled in advance, and thus a stereoscopic warehouse fault alarm is issued to remind the staff to handle it manually.

In the implementation designed above, this solution determines, based on whether the fault identifier sent by the actual stereoscopic warehouse management server is in the set of handleable-fault identifiers, whether the fault has been handled during the scheduling simulation; if it has been handled, executes the determination of the first optimization information according to the fault information, so as to achieve automatic scheduling update; and if it has not been handled, issues the stereoscopic warehouse fault alarm to remind the staff to handle it manually, thus improving the reliability and efficiency of scheduling of the stereoscopic warehouse.

Figure 10:
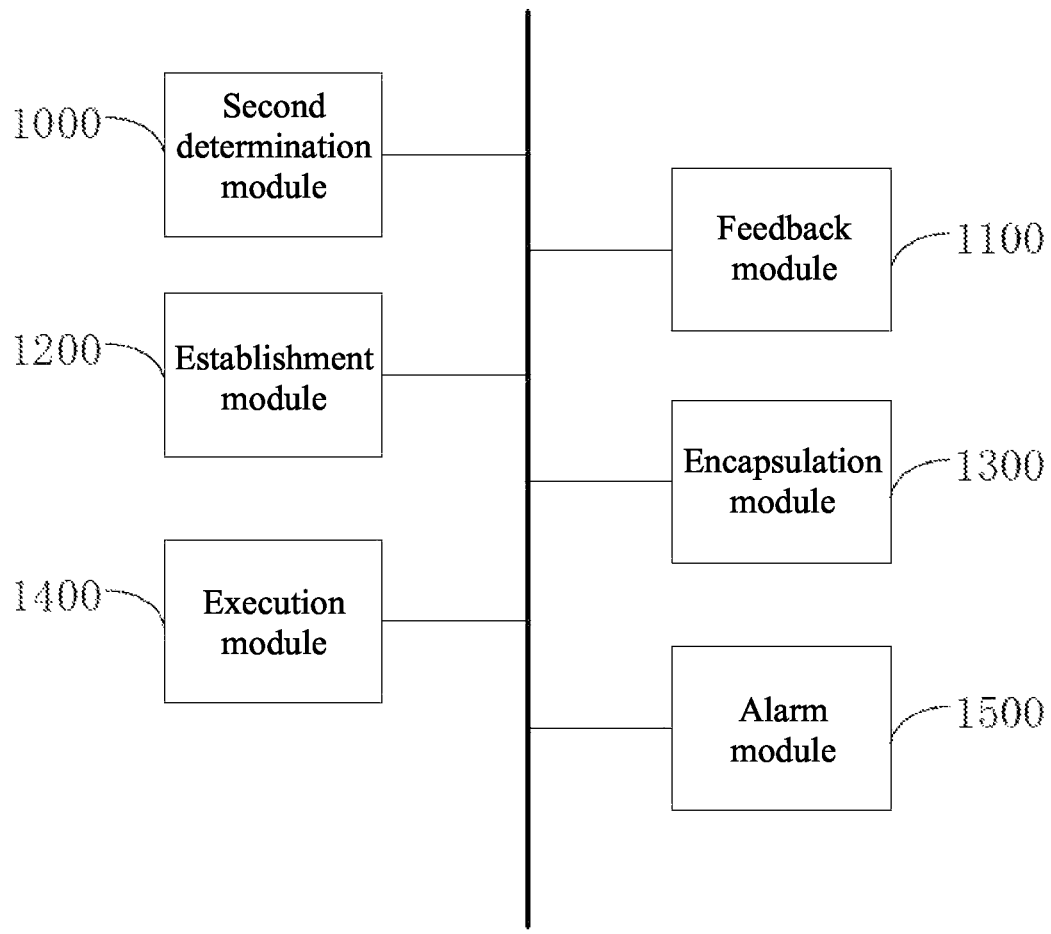
FIG. 10 is a schematic structural view of another scheduling apparatus provided in the present application.

FIG. 10 illustrates a schematic structural block diagram of another scheduling apparatus provided by the present application, and it should be understood that, this apparatus corresponds to the method embodiments executed by the stereoscopic warehouse simulation model management server in FIGS. 7 to 9, and is capable of executing the steps involved in the aforementioned methods. The specific functions of the apparatus can be found in the description above, and the detailed description is appropriately omitted here to avoid repetition. The apparatus comprises at least one software function module capable of being stored in memory or cured in the operating system (OS) of the apparatus in the form of software or firmware. Specifically, the apparatus comprises: a second determination module 1000 and a feedback module 1100, the second determination module 1000 being used for determining, upon receiving fault information sent by an actual stereoscopic warehouse management server, first optimization information according to the fault information, wherein the first optimization information comprises a scheduling optimization operation for the case of a target scheduling policy scheduling fault; and the feedback module 1100 being used for feeding the first optimization information back to a warehouse management server to cause the warehouse management server to determine a first scheduling update instruction according to the first optimization information so that the actual stereoscopic warehouse management server executes a corresponding scheduling update operation according to the first scheduling update instruction.

In the technical solution of the embodiments of the present application, this solution determines first optimization information by the second determination module 1000 of the stereoscopic warehouse simulation model management server based on the fault information generated by the actual stereoscopic warehouse management server in the actual scheduling process, and then feeds the first optimization information back to the warehouse management server via the feedback module 1100, so that the warehouse management server performs scheduling update according to the first optimization information, thereby solving the problem that the existing scheduling simulation method cannot handle and alleviate the fault problem existing in the logistics task, thus improving the work efficiency, work quality and reliability of the actual stereoscopic warehouse scheduling.

According to some embodiments of the present application, the apparatus further comprises an establishment module 1200 for establishing a stereoscopic warehouse simulation model, wherein the stereoscopic warehouse simulation model comprises a simulation layout of a stereoscopic warehouse, various simulated components of the stereoscopic warehouse, a set of multiple handleable-fault identifiers, and a handling policy corresponding to each fault identifier.

According to some embodiments of the present application, the apparatus further comprises an encapsulation module 1300 for performing encapsulation processing on the stereoscopic warehouse simulation model and/or the various simulated components in the stereoscopic warehouse simulation model.

In some embodiments of the present application, the fault information comprises a fault identifier, and the apparatus further comprises an execution module 1400 for executing, when a fault identifier identical to the fault identifier sent by the actual stereoscopic warehouse management server is found in the set of handleable-fault identifiers, the step of determining the first optimization information according to the fault information, wherein the set of handleable-fault identifiers contains multiple handleable-fault identifiers, and the set of handleable-fault identifiers is obtained through setting when the stereoscopic warehouse simulation model is established.

According to some embodiments of the present application, the apparatus further comprises an alarm module 1500 for issuing a stereoscopic warehouse fault alarm when no fault identifier identical to the fault identifier sent by the actual stereoscopic warehouse management server is found in the set of handleable-fault identifiers.

Figure 11:
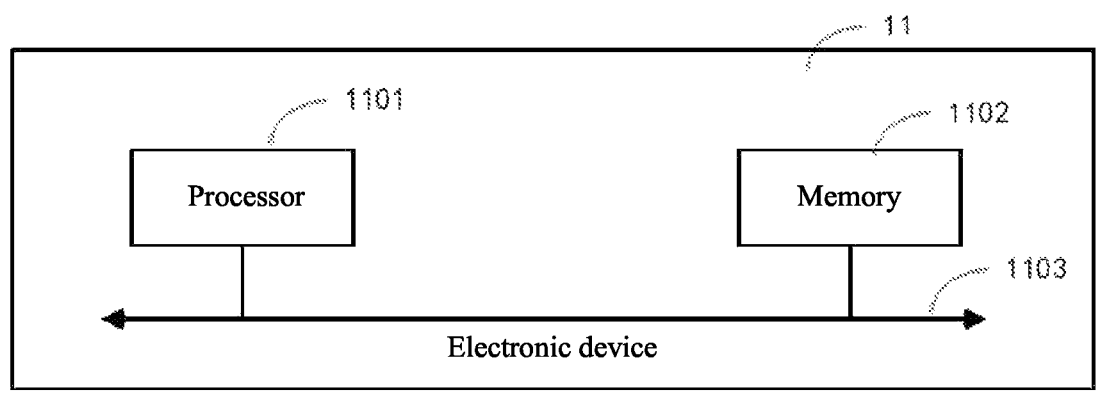
FIG. 11 is a schematic structural view of an electronic device provided in the present application.

According to some embodiments of the present application, as shown in FIG. 11, the present application provides an electronic device 11 comprising: a processor 1101 and a memory 1102, the processor 1101 and the memory 1102 being in interconnection and communication with each other via a communication bus 1103 and/or other form of connection mechanism (not shown), and the memory 1102 storing a computer program executable by the processor 1101, wherein the processor 1101, when the electronic device is running, executes this computer program to execute a method executed by an external machine in any of the optional implementations, such as steps S200 to step S210: sending a scheduling instruction to an actual stereoscopic warehouse management server and a stereoscopic warehouse simulation model management server; and responding to first optimization information and determining a first scheduling update instruction; or steps S700 to S710: determining first optimization information according to fault information sent by an actual stereoscopic warehouse management server; and feeding the first optimization information back to the warehouse management server.

The present application provides a non-transitory computer-readable storage medium having a computer program stored thereon, wherein the computer program, when run by a processor, executes a method in any of the preceding optional implementations.

Here, the storage medium may be implemented by any types of volatile or non-volatile storage devices or a combination thereof, such as a static random access memory (SRAM), an electrically erasable programmable read-only memory (EEPROM), an erasable programmable read only memory (EPROM), a programmable read-only memory (PROM), a read-only memory (ROM), a magnetic memory, a flash memory, a disk or an optical disk.

The present application provides a computer program product, wherein the computer program product, when run on a computer, causes the computer to execute the method in any of the optional implementations.

Finally, it should be noted that the above embodiments are used only to illustrate, in stead of limiting, the technical solutions of the present application; although the present application is described in detail with reference to the preceding embodiments, it should be understood by those of ordinary skill in the art that: it is still possible to modify the technical solutions recorded in the preceding embodiments, or to equivalently replace some or all of the technical features; and these modifications or replacements do not make the essence of the corresponding technical solutions depart from the scope of the technical solutions of the embodiments of the present application, which should be covered by the scope of the claims and specification of the present application. In particular, the technical features mentioned in the various embodiments can be combined in any manner as long as there is no structural conflict. The present application is not limited to the particular embodiments disclosed in the text, but includes all technical solutions that fall within the scope of the claims.

What is claimed is:

1. A scheduling method applied to an electronic device, the scheduling method comprising:

sending a scheduling instruction to an actual stereoscopic warehouse management server and a stereoscopic warehouse simulation model management server, and causing the actual stereoscopic warehouse management server to control a palletizer to execute scheduling operation according to the scheduling instruction, wherein the scheduling instruction corresponds to a target scheduling policy, the target scheduling policy including controlling the palletizer to transport, in accordance with an operation path in the target scheduling policy, materials from a fetching position to a storage position at a warehouse and store them into the warehouse;

determining that a fault occurs during the executing scheduling operation, the fault including a fetching position fault or a placing warehouse position fault;

transmitting fault information including a fault type of the fault and a fault identifier to the stereoscopic warehouse simulation model management server;

determining that a fault identifier identical to the fault identifier of the transmitted fault information is found in a set of handleable-fault identifiers;

determining first optimization information according to the fault information and a prestored database including multiple fault types and scheduling optimization operations corresponding to the fault types respectively; wherein the first optimization information comprises a scheduling optimization operation for a case of a target scheduling policy scheduling fault, the first optimization information including a scheduling optimization operation for a case of the fetching position fault or a scheduling optimization operation for a case of the placing warehouse position fault;

determining a first scheduling update instruction based on the first optimization information; and causing the actual stereoscopic warehouse management server to control the palletizer to execute updated scheduling operation according to the first scheduling update instruction to transport the materials and store them in the warehouse, wherein prior to said sending a scheduling instruction to an actual stereoscopic warehouse management server and a stereoscopic warehouse simulation model management server, the scheduling method further comprises:

acquiring multiple types of to-be-verified scheduling policies;

sending, according to each type of to-be-verified scheduling policy, a scheduling instruction corresponding to the to-be-verified scheduling policy to the stereoscopic warehouse simulation model management server;

acquiring completion time for each to-be-verified scheduling policy to execute scheduling simulation in the stereoscopic warehouse simulation model management server; and determining the target scheduling policy among the multiple to-be-verified scheduling policies according to the completion time of scheduling simulation for each to-be-verified scheduling policy, wherein said determining the target scheduling policy among the multiple to-be-verified scheduling policies according to the completion time of scheduling simulation for each to-be-verified scheduling policy comprises:

determining, among the multiple to-be-verified scheduling policies, a to-be-verified scheduling policy with the shortest completion time of scheduling simulation as the target scheduling policy, and wherein prior to said acquiring completion time for each to-be-verified scheduling policy to execute scheduling simulation in the stereoscopic warehouse simulation model management server, the scheduling method further comprises:

for each to-be-verified scheduling policy, responding to second optimization information regarding a simulation fault corresponding to the to-be-verified scheduling policy, and determining a corresponding second scheduling update instruction, wherein the second optimization information comprises a scheduling optimization operation for the case of the simulation fault of the corresponding to-be-verified scheduling policy; and sending the second scheduling update instruction corresponding to the to-be-verified scheduling policy to the stereoscopic warehouse simulation model management server.

2. The method according to claim 1, wherein prior to said responding to first optimization information, the method further comprises:

receiving the first optimization information sent by the stereoscopic warehouse simulation model management server, wherein the first optimization information is obtained by means of identification by the stereoscopic warehouse simulation model management server of a fault produced during the execution of the target scheduling policy by the actual stereoscopic warehouse management server.

3. The method according to claim 1, wherein after said responding to first optimization information and determining a first scheduling update instruction, the method further comprises:

sending the first scheduling update instruction to the actual stereoscopic warehouse management server.

4. An electronic device comprising a memory and a processor, the memory storing a computer program, and the processor, when executing the computer program, implementing a scheduling method including:

sending a scheduling instruction to an actual stereoscopic warehouse management server and a stereoscopic warehouse simulation model management server, and causing the actual stereoscopic warehouse management server to control a palletizer to execute scheduling operation according to the scheduling instruction, wherein the scheduling instruction corresponds to a target scheduling policy, the target scheduling policy including controlling the palletizer to transport, in accordance with an operation path in the target scheduling policy, materials from a fetching position to a storage position at a warehouse and store them into the warehouse;

determining that a fault occurs during the executing scheduling operation, the fault including a fetching position fault or a placing warehouse position fault;

transmitting fault information including a fault type of the fault and a fault identifier to the stereoscopic warehouse simulation model management server;

determining that a fault identifier identical to the fault identifier of the transmitted fault information is found in a set of handleable-fault identifiers;

determining first optimization information according to the fault information and a prestored database including multiple fault types and scheduling optimization operations corresponding to the fault types respectively; wherein the first optimization information comprises a scheduling optimization operation for a case of a target scheduling policy scheduling fault, the first optimization information including a scheduling optimization operation for a case of the fetching position fault or a scheduling optimization operation for a case of the placing warehouse position fault;

determining a first scheduling update instruction based on the first optimization information; and causing the actual stereoscopic warehouse management server to control the palletizer to execute updated scheduling operation according to the first scheduling update instruction to transport the materials and store them in the warehouse, wherein prior to said sending a scheduling instruction to an actual stereoscopic warehouse management server and a stereoscopic warehouse simulation model management server, the scheduling method further comprises:

acquiring multiple types of to-be-verified scheduling policies;

sending, according to each type of to-be-verified scheduling policy, a scheduling instruction corresponding to the to-be-verified scheduling policy to the stereoscopic warehouse simulation model management server;

acquiring completion time for each to-be-verified scheduling policy to execute scheduling simulation in the stereoscopic warehouse simulation model management server; and determining the target scheduling policy among the multiple to-be-verified scheduling policies according to the completion time of scheduling simulation for each to-be-verified scheduling policy, wherein said determining the target scheduling policy among the multiple to-be-verified scheduling policies according to the completion time of scheduling simulation for each to-be-verified scheduling policy comprises:

determining, among the multiple to-be-verified scheduling policies, a to-be-verified scheduling policy with the shortest completion time of scheduling simulation as the target scheduling policy, and wherein prior to said acquiring completion time for each to-be-verified scheduling policy to execute scheduling simulation in the stereoscopic warehouse simulation model management server, the scheduling method further comprises:

for each to-be-verified scheduling policy, responding to second optimization information regarding a simulation fault corresponding to the to-be-verified scheduling policy, and determining a corresponding second scheduling update instruction, wherein the second optimization information comprises a scheduling optimization operation for the case of the simulation fault of the corresponding to-be-verified scheduling policy; and sending the second scheduling update instruction corresponding to the to-be-verified scheduling policy to the stereoscopic warehouse simulation model management server.

5. The electronic device according to claim 4, wherein prior to said responding to first optimization information, the method further comprises:

receiving the first optimization information sent by the stereoscopic warehouse simulation model management server, wherein the first optimization information is obtained by means of identification by the stereoscopic warehouse simulation model management server of a fault produced during the execution of the target scheduling policy by the actual stereoscopic warehouse management server.

6. The electronic device according to claim 4, wherein after said responding to first optimization information and determining a first scheduling update instruction, the method further comprises:

sending the first scheduling update instruction to the actual stereoscopic warehouse management server.

7. A non-transitory computer-readable storage medium storing a computer program, the computer program, when executed by a processor of an electronic device, causing the electronic device to implement a scheduling method including:

sending a scheduling instruction to an actual stereoscopic warehouse management server and a stereoscopic warehouse simulation model management server, and causing the actual stereoscopic warehouse management server to control a palletizer to execute scheduling operation according to the scheduling instruction, wherein the scheduling instruction corresponds to a target scheduling policy, the target scheduling policy including controlling the palletizer to transport, in accordance with an operation path in the target scheduling policy, materials from a fetching position to a storage position at a warehouse and store them into the warehouse;

determining that a fault occurs during the executing scheduling operation, the fault including a fetching position fault or a placing warehouse position fault;

transmitting fault information including a fault type of the fault and a fault identifier to the stereoscopic warehouse simulation model management server;

determining that a fault identifier identical to the fault identifier of the transmitted fault information is found in a set of handleable-fault identifiers;

determining first optimization information according to the fault information and a prestored database including multiple fault types and scheduling optimization operations corresponding to the fault types respectively; wherein the first optimization information comprises a scheduling optimization operation for a case of a target scheduling policy scheduling fault, the first optimization information including a scheduling optimization operation for a case of the fetching position fault or a scheduling optimization operation for a case of the placing warehouse position fault;

determining a first scheduling update instruction based on the first optimization information; and causing the actual stereoscopic warehouse management server to control the palletizer to execute updated scheduling operation according to the first scheduling update instruction to transport the materials and store them in the warehouse, wherein prior to said sending a scheduling instruction to an actual stereoscopic warehouse management server and a stereoscopic warehouse simulation model management server, the scheduling method further comprises:

acquiring multiple types of to-be-verified scheduling policies;

sending, according to each type of to-be-verified scheduling policy, a scheduling instruction corresponding to the to-be-verified scheduling policy to the stereoscopic warehouse simulation model management server;

acquiring completion time for each to-be-verified scheduling policy to execute scheduling simulation in the stereoscopic warehouse simulation model management server; and determining the target scheduling policy among the multiple to-be-verified scheduling policies according to the completion time of scheduling simulation for each to-be-verified scheduling policy, wherein said determining the target scheduling policy among the multiple to-be-verified scheduling policies according to the completion time of scheduling simulation for each to-be-verified scheduling policy comprises:

determining, among the multiple to-be-verified scheduling policies, a to-be-verified scheduling policy with the shortest completion time of scheduling simulation as the target scheduling policy, and wherein prior to said acquiring completion time for each to-be-verified scheduling policy to execute scheduling simulation in the stereoscopic warehouse simulation model management server, the scheduling method further comprises:

for each to-be-verified scheduling policy, responding to second optimization information regarding a simulation fault corresponding to the to-be-verified scheduling policy, and determining a corresponding second scheduling update instruction, wherein the second optimization information comprises a scheduling optimization operation for the case of the simulation fault of the corresponding to-be-verified scheduling policy; and sending the second scheduling update instruction corresponding to the to-be-verified scheduling policy to the stereoscopic warehouse simulation model management server.

8. The non-transitory computer-readable storage medium according to claim 7, wherein prior to said responding to first optimization information, the method further comprises:

receiving the first optimization information sent by the stereoscopic warehouse simulation model management server, wherein the first optimization information is obtained by means of identification by the stereoscopic warehouse simulation model management server of a fault produced during the execution of the target scheduling policy by the actual stereoscopic warehouse management server.

9. The non-transitory computer-readable storage medium according to claim 7, wherein after said responding to first optimization information and determining a first scheduling update instruction, the method further comprises:

sending the first scheduling update instruction to the actual stereoscopic warehouse management server.

\* \* \* \* \*